Figure 1:
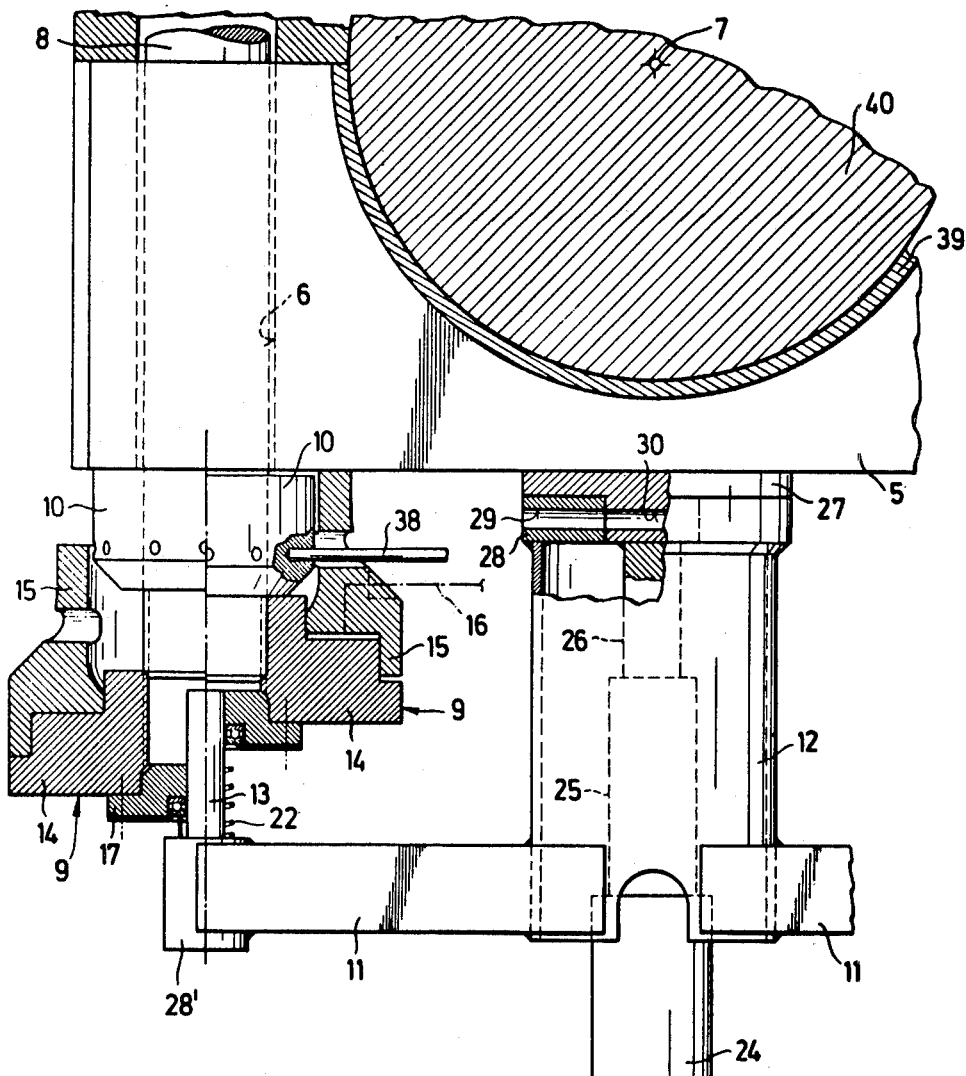

United States Patent [19]

Fehr

[11] 4,145,799

[45] Mar. 27, 1979

[54] APPARATUS FOR FITTING AND DISMANTLING A CRANKSHAFT BEARING CAP IN AN INTERNAL COMBUSTION ENGINE

[75] Inventor: Heinz Fehr, Berg am Irchel, Switzerland

[73] Assignee: Sulzer Brothers Limited, Winterthur, Switzerland

[21] Appl. No.: 860,969

[22] Filed: Dec. 15, 1977

[30] Foreign Application Priority Data

Dec. 30, 1976 [CH] Switzerland .................. 16461/76

[51] Int. Cl.² ............................................ B23P 19/04
[52] U.S. Cl. ............................................... 29/252
[58] Field of Search .................. 29/252; 254/29 A

[56] References Cited

U.S. PATENT DOCUMENTS

| 3,099,075 | 7/1963 | McDaniels et al. | 29/252 |
| 3,885,290 | 5/1975 | Bouquet | 29/252 |
| 3,916,499 | 11/1975 | Frame et al. | 29/252 |

Primary Examiner—James L. Jones, Jr.
Attorney, Agent, or Firm—Kenyon & Kenyon, Reilly, Carr & Chapin

[57] ABSTRACT

The apparatus is provided with a piston-and-cylinder unit which carries a flange for abutting under the bearing cap as well as a pre-loading press which is mounted on an arm which extends radially from the piston-and-cylinder unit. The arm is movable together with the piston-and-cylinder unit so as to be positioned below the bolts which secure the bearing cap in place. The arm has a guide device mounted at the end which permits axial and rotating movements of the pre-loading press and is surrounded by a spring by which the press is carried.

10 Claims, 2 Drawing Figures

APPARATUS FOR FITTING AND DISMANTLING A CRANKSHAFT BEARING CAP IN AN INTERNAL COMBUSTION ENGINE

This invention relates to an apparatus for fitting and dismantling a crankshaft bearing in an internal combustion engine.

As is known, various types of devices have been used for fitting and dismantling crankshaft bearing caps in an internal combustion engine. In some cases, these devices have utilized a piston-and-cylinder unit which is placed beneath the crankshaft bearing cap and is operable by a pressure medium to raise and lower the bearing cap. In addition, a plate is fixed on the part of the piston-and-cylinder unit which is intended to raise and lower the cap so as to enclose the part. The plate is stiffened by means of radial arms and is provided with two holes in line with the bolts which fix the bearing cap in place. In addition, a pre-loading press is positioned within each of these holes and rests on a flange bolted to the plate. Each press is constructed so as to permit a rotary movement. These presses serve to elastically stress the bolts when mounting or removing a nut from the bolt. To this end, in addition to the screw thread for the nuts holding the bearing cap in place, the bolts have a second smaller diameter screw thread at the lower ends which project through the bearing cap. This smaller diameter threaded portion is adapted to be engaged by the respective pre-loading presses so as to permit elastic stressing of the bolts prior to tightening of the nuts.

The above types of devices are relatively complex in construction and occupy a relatively large amount of space. This is disadvantageous particularly if the device is left inside an internal combustion housing during operation. Another disadvantage is that the pre-loading press rests on the flange which is bolted to the plate. Since this produces a relatively rigid connection between the piston-and-cylinder unit and the pre-loading presses, it may become difficult for the presses to be easily fitted to the connecting bolt screw threads particularly if the axis of the press and of the associated bolt are not in exact alignment.

Accordingly, it is an object of the invention to provide an apparatus wherein a pre-loading press can be readily fitted to the screw thread of a bearing cap fixing bolt.

It is another object of the invention to provide a simple apparatus for fitting and dismantling a crankshaft bearing cap in an internal combustion engine.

It is another object of the invention to provide an apparatus of relatively low cost for fitting and dismantling a crankshaft bearing cap in an internal combustion engine.

Briefly, the invention provides an apparatus for fitting and dismantling a crankshaft bearing cap in an internal combustion engine which comprises a piston-and-cylinder unit, an arm which extends radially from the unit, a guide device on the arm, a spring surrounding the device and a pre-loading press guided on the guide device for rotary and axial movements. The arm extends from the unit to a position beneath a bolt which serves to secure the bearing cap in place while the pre-loading press rests on the spring which surrounds the guide device.

The apparatus can be provided with a plurality of arms of a number equal to the number of pre-loading presses required to pre-stress the bolts securing a bearing cap in place.

By using one radial arm per pre-loading press instead of a plate as heretofore used, the construction of the apparatus is greatly simplified. Further, by using the guide device, the apparatus can be made relatively economically. Further, the apparatus occupies a relatively compact space and can thus remain within an internal combustion engine housing.

The guide device for the pre-loading press obviates any need for a rigid connection to the arm so that the pre-loading press can be fitted more easily to the screw thread of a fixing bolt. This is also facilitated by the spring which carries the pre-loading press.

In a very simple embodiment, the guide device consists of a stud which is fixed on the arm and extends into the press. In this case, a roller thrust bearing is exposed between the spring and the press.

In another embodiment, the pre-loading press is provided with the same screw thread as the nut which is screwed onto the bolt which is to be stressed. The production of the bolts can thus be simplified as only a single thread has to be formed on the end which projects from the bearing cap.

Figure 2:
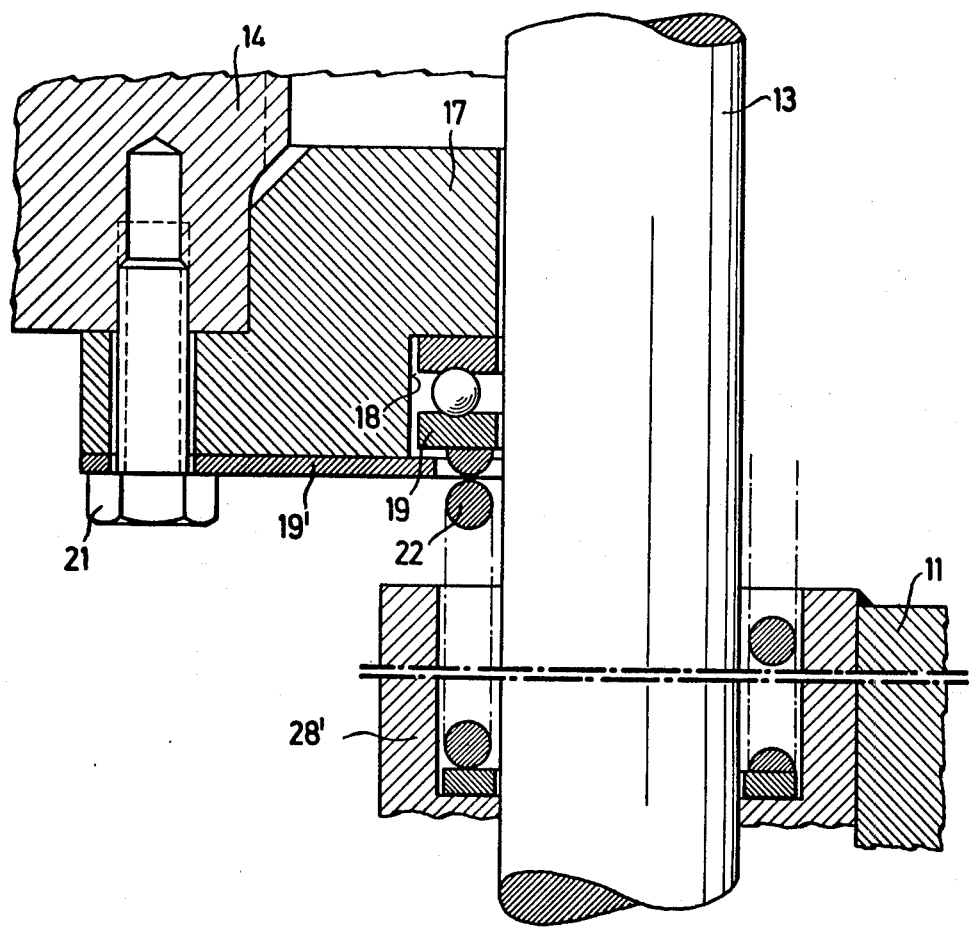

These and other objects and advantages of the invention will become more apparent from the following detailed description and accompanying drawings in which:

FIG. 1 illustrates an axial sectional view through an apparatus according to the invention; and FIG. 2 illustrates a detail of the apparatus to a larger scale in FIG. 1.

Referring to FIG. 1, the apparatus for fitting and dismantling a crankshaft bearing cap 5 in an internal combustion engine comprises a piston-and-cylinder unit 1 which is accommodated within the housing (not shown) of the engine which, for example is of the V-type. The bottom of the unit 1 rests in a trough 2 which closes the housing at the bottom. In addition, the unit 1 has a connection 3 for a conduit (not shown) through which pressure oil is supplied. The unit 1 is slideable in the trough 2 in the longitudinal direction of the crankshaft (not shown) so as to be brought into an operative position beneath each crankshaft main bearing. In this position, the vertical axis of the unit 1 intersects the axis 7 of the crankshaft journal 40 about which the bearing cap 5 is disposed.

As shown, the piston-and-cylinder unit 1 comprises three reciprocable pistons 24, 25, 26 which are disposed and guided telescopically within one another in known manner and which are adapted to be raised and lowered by means of the pressure oil delivered to the cylinder via the connection 3. In addition, a flange 27 is fixed at the top end of the inner most piston 26 and is disposed to abut against a bearing cap 5 belonging to a main bearing of the crankshaft. The flange 27 also has a diametric bore 30 passing therethrough.

The apparatus also has an arm 11 which is disposed radially of the unit 1 and a means for selectively securing the arm 11 to the flange 27 of the unit 1. This means includes a ring 28 which has a radial bore 29 for aligning with the bore 30 of the flange 27. In addition, the means has a sleeve 12 which depends from the ring 28 and to which the arm 11 is welded. When the pistons 24, 25, 26 are in the lowered position (not shown) the sleeve 12 fits over the cylinder unit 1 to provide a compact appearance. When the ring 28 is aligned with the flange 27, a coupling pin (not shown) can be fitted through the respective bores 29, 30 so as to connect the sleeve 12 to the innermost piston 26. As shown in FIG. 1, the ring 28 has an inside diameter which is greater than the piston 25 but which is smaller than the piston 24 so as to rest on the piston 24 in the lower inoperative position.

As shown in FIG. 1, the bearing cap 5 carries a replaceable bearing bush 39 and is held against the journal 40 by means of bolts 8 (only one of which is shown for simplicity). Each bolt 8 passes through a bore 6 in the bearing cap 5 and has a nut 10 threaded at the exposed end. Each nut 10 bears against the bearing cap 5 to hold the cap 5 in place. The bores 6 are disposed outside of the bearing surface symetrically with respect to the axis 7 of the journal 40. The bolts 8 are fixed in the housing (not shown) of the internal combustion engine and are pre-stressed in known manner by means of a pre-loading press 9 before the nuts 10 are tightened against the bearing cap 5. As shown, each nut 10 has a number of radial blind holes distributed over the periphery and into which a pin 38 can be inserted for tightening of the nuts 10.

The pre-loading press 9 is mounted on the arm 11. As shown in FIG. 1, the pre-loading press 9 is formed of a pair of cooperating annular parts 14, 15 which have mating step surfaces. In addition, a conduit 16, shown by chain dotted line, passes through the uppper part 15 in order to supply a hydraulic fluid to between the surfaces to affect a separation of the parts 14, 15 from each other. As shown, the conduit leads into the central portion of one of the step surfaces. Thus, when a hydraulic fluid such as a pressure oil is applied, a pressure chamber filled with oil forms between the mid-portions of the stepped surfaces. The lower part 14 is provided with a screw thread on an inner cylindrical surface so as to be threaded onto the thread end of the bolt 8 projecting from the bearing cap 5. The diameter of the screw thread is equal to the screw thread of the bolt 8. The press 9 also has an annular disc 17 of Z-shaped cross-section which is fitted within the lower part 14.

The apparatus also has a guide device at the end of each arm 11 for guiding a press 9 thereon for rotary and axial movement. As shown in FIGS. 1 and 2, the guide device includes a sleeve 28' which is secured at the free end of the arm 11 and which is opened at the top and a stud 13 which extends upwardly from the sleeve 28' in alignment with the axis of a bolt 8. This stud 13 forms a guide for the pre-loading press 9 and permits the press to move axially as well as rotatably thereon. As is shown in FIG. 2, the Z-shaped disc 17 of the press 9 serves to guide the parts 14, 15 of the press on the stud 13. In addition, a spring 22 is disposed about the stud 13 and is seated in the cavity formed at the top of the sleeve 28'. Also, a roller thrust bearing 19 is positioned in a recess of the Z-shaped disc 17 and is held in place by a plate 19' which is secured against the underside of the disc 17. The plate 19' is fixed to the disc 17 by means of bolts 21 which connect the disc 17 to the underside of the part 14 of the press 9. The coil spring 22 is thus provided between the roller bearing 19 and the sleeve 28' so as to bear the weight of the press 9.

In order to dismantle the bearing cap 5, the apparatus is first brought into the position beneath the crankshaft journal 40. In this position, the pistons 24, 25, 26 are in a retracted state. That is, the sleeve 12 and the arms 11 with the pre-loading presses 9 thereon are in their lower most position (not shown). A coupling pin is then engaged in the two bores 29, 30 in the ring 28 and flange 27, respectively so that the sleeve 12 is connected to the innermost piston 26. The pistons are then fed with pressure oil so as to successively extend until the innermost piston 26 is brought against the bottom surface of the bearing cap 5. Since the coupling pin has been fitted, the sleeve 12 together with the arms 11 and the pre-loading presses 9 are also lifted. Thus, the pistons 24, 25, 26 and the presses 9 occupy the positions as indicated in FIG. 1. For purposes of simplicity, only one of the arms 11 and one of the presses 9 is shown.

Next, the pre-loading press 9 is secured to the stud bolt 8 by threading the part 14 onto the bolt 8 until the top end face the part 15 bears against the bearing cap 5. Pressure oil is then fed to the press 9 via the conduit 16 causing the part 14 to move away from the part 15. This, in turn, causes the bolt 8 to elastically stretch. This position is shown in FIG. 1 in the right hand half of the pre-loading press 9.

Next, the nut 10 is released by means of the pin 38 until the nut 10 no longer abuts against the bearing cap 5 when the pressure oil supplied to the press 9 is discontinued and the bolt 8 is released. The press 9 is then unscrewed from the bolt 8 so as to be carried on the arm 11.

Thereafter, the pressure oil supplied to the pistons 24, 25, 26 is discontinued so that the pistons move to their lower position. The bearing cap then drops slightly until coming to rest on the slightly released nuts 10 on the bolts 8. The coupling pin is then removed from the bore 30 and the pistons 24, 25, 26 are again supplied with pressure oil. On the resulting extension of the pistons 24, 25, 26, the sleeve 12 is driven only by the outermost piston 24. Thus, the arm 11 stops at approximately mid height between the trough 2 and the position shown in FIG. 1. Since the bearing cap 5 is now again supported by the piston-and-cylinder unit 1, the nut 10 can be completely unscrewed from the stud bolt 8. For this purpose, a board or the like is advantageously placed on top of the press 9 to receive the nut 10. After the nut 10 and the board have been removed from the press 9, the pressure oil supplied to the pistons 24, 25, 26 is again discontinued. The pistons then lower and the bearing cap is lowered into a lower most position so that the bearing bush 39 can be replaced. After this is accomplished, the bearing cap 5 is refitted. In this case, the steps for refitting are exactly in the reverse sequence to the dismantling steps described above.

It is to be noted that it is possible to provide the apparatus with only one arm 11 and only one pre-loading press 9. In this case, the arm 11 has to be pivoted to and fro alternately from one fixing bolt to the other between the individual operations.

What is claimed is:

1. An apparatus for fitting and dismantling a crankshaft bearing cap in an internal combustion engine, said apparatus comprising
    a piston-and-cylinder unit for placement beneath a bearing cap;
    an arm extending radially from said unit to beneath a bolt securing the bearing cap in place;
    a guide device on said arm and aligned with the bolt;
    a spring surrounding said device; and
    a pre-loading press guided on said guide device for rotary and axial movement and resting on said spring.

2. An apparatus as set forth in claim 1 wherein said device includes a stud fixed on said arm and extending into said press.

3. An apparatus as set forth in claim 1 which further comprises a roller thrust bearing between said spring and said press.

4. In combination with a bearing cap for a crankshaft journal, a plurality of bolts and a plurality of nuts, each nut being secured to a screwthread of a respective bolt against said bearing cap for securing said cap about the journal; an apparatus for fitting and dismantling said bearing cap on and off the journal, said apparatus comprising
- a piston-and-cylinder unit for placement beneath said bearing cap, said unit including at least one reciprocable piston;
- an arm extending radially from said unit to beneath a respective bolt;
- a guide device on said arm and aligned with said bolt;
- a spring surrounding said device; and
- a pre-loading press guided on said guide device for rotary and axial movement and resting on said spring.

5. The combination as set forth in claim 4 wherein said press has a screwthread of a diameter equal to said screwthread of said nut.

6. An apparatus for dismantling a crankshaft bearing cap from a crankshaft journal of an internal combustion engine, said apparatus comprising
- a piston-and-cylinder unit including a plurality of reciprocable pistons disposed in telescoping relation, and a flange at one end of an innermost piston;
- an arm disposed radially of said unit;
- means for selectively securing said arm to said flange of said unit;
- a guide device at an end of said arm, said guide device including an upstanding stud;
- a pre-loading press guided on said stud for rotary and axial movement to prestress a bolt paassing through a bearing cap of an internal combustion engine; and
- a spring surrounding said stud and supporting said press thereon.

7. An apparatus as set forth in claim 6 wherein said flange has a diametric bore and said means includes a ring having a radial bore for aligning with said bore of said flange, a sleeve depending from said ring and having said arm fixed thereto in radial relation, and a pin for selective passage through said bores of said ring and said flange.

8. An apparatus as set forth in claim 7 wherein said ring has an inside diameter greater than one of said pistons and smaller than another of said pistons to rest on said another piston in an inoperative position.

9. An apparatus as set forth in claim 6 which further comprises a roller thrust bearing between said spring and said press.

10. An apparatus as set forth in claim 6 wherein said press includes a pair of annular parts having mating stepped surfaces, and a conduit in one of said parts for supplying hydraulic fluid to between said surfaces to effect a separation of said parts from each other.

* * * * *